E. HELMUS.
ANTIVIBRATION DEVICE FOR VEHICLES.
APPLICATION FILED JULY 17, 1907.
978,291.
Patented Dec. 13, 1910.
2 SHEETS—SHEET 1.
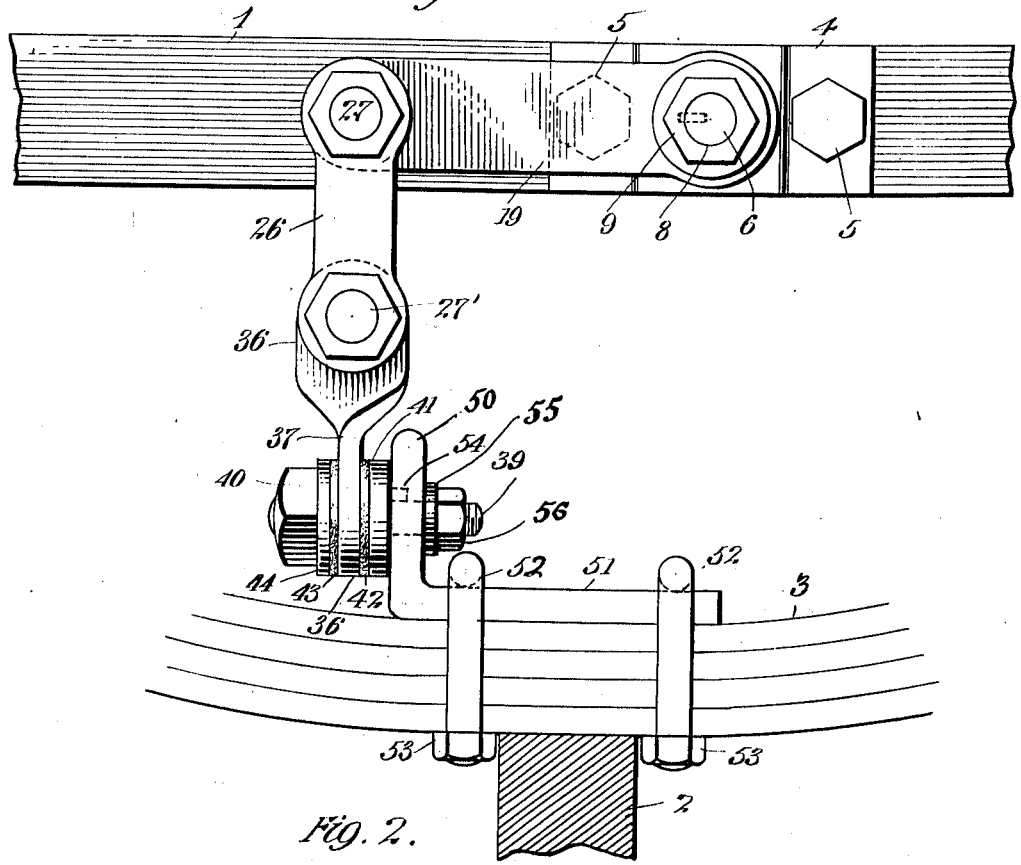
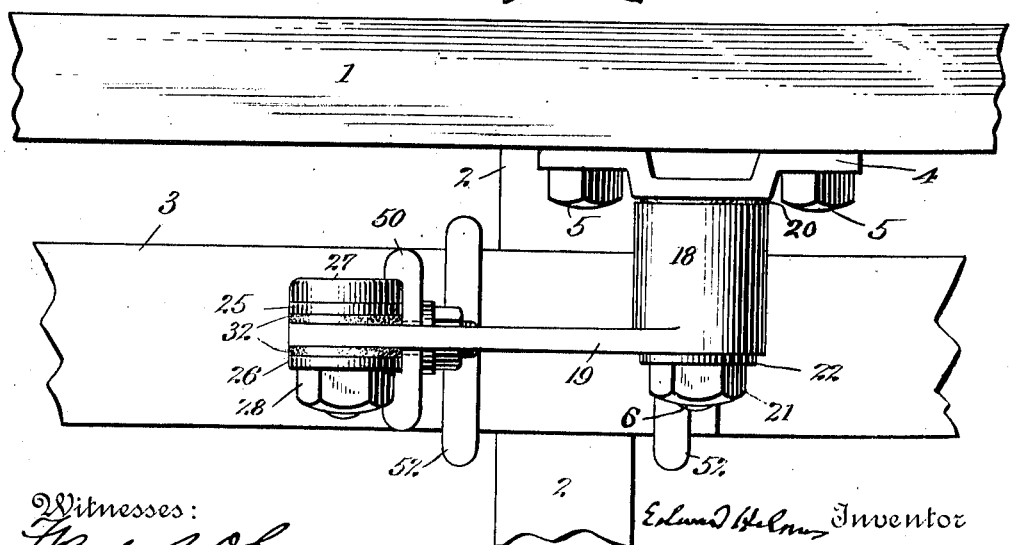
Witnesses:
Edward Helmus, Inventor
By his Attorney

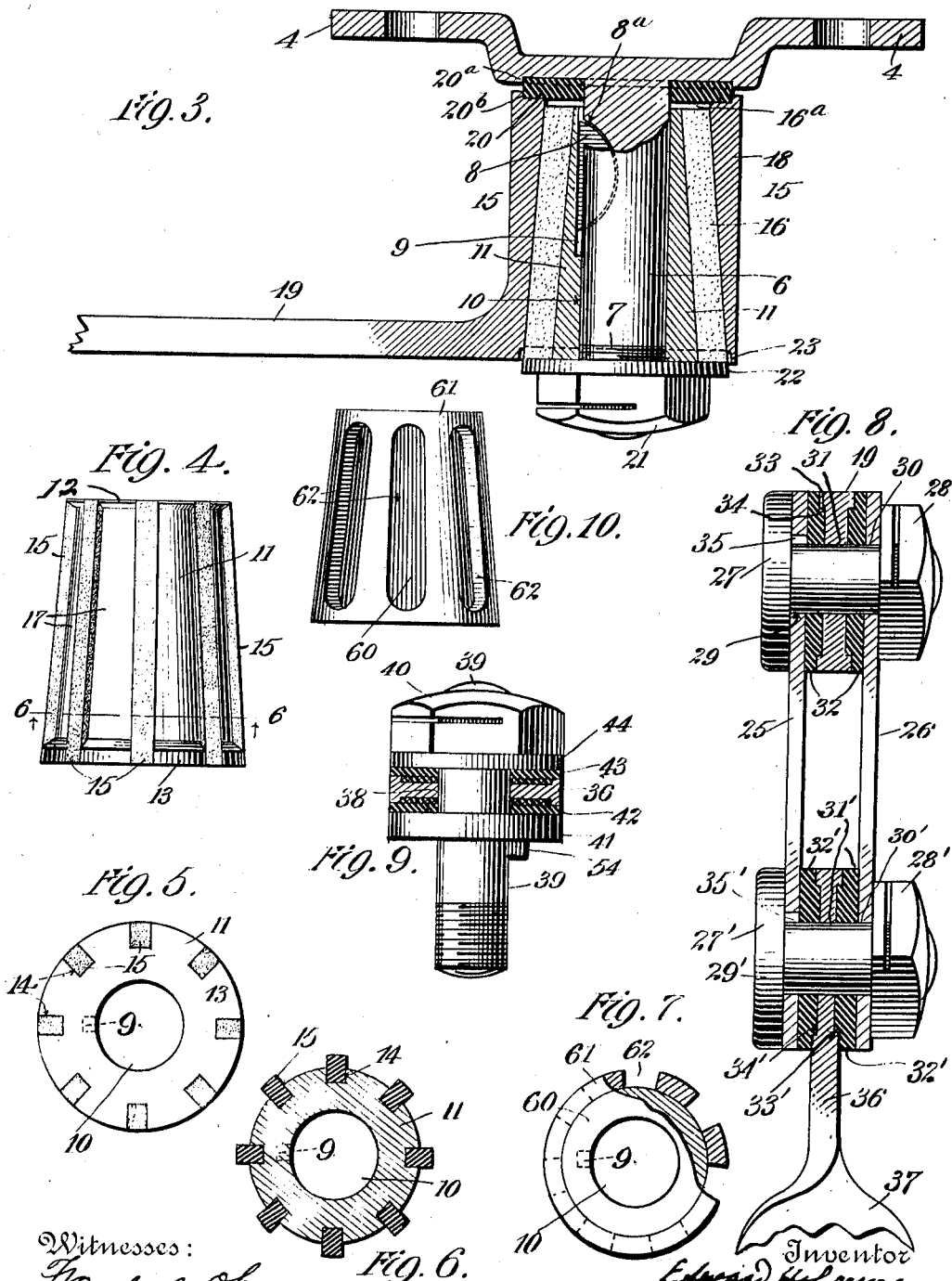

UNITED STATES PATENT OFFICE.

EDWARD HELMUS, OF BROOKLYN, NEW YORK.

ANTIVIBRATION DEVICE FOR VEHICLES.

978,291.　　　　Specification of Letters Patent.　　Patented Dec. 13, 1910.

Application filed July 17, 1907. Serial No. 384,150.

*To all whom it may concern:*

Be it known that I, EDWARD HELMUS, a citizen of the United States, residing in Brooklyn, Kings county, State of New York, have invented certain new and useful Improvements in Antivibration Devices for Vehicles, of which the following is such a full, clear, and exact description as will enable any one skilled in the art to which it appertains to make and use the same, reference being had to the accompanying drawings, forming part of this specification.

My invention relates to anti-vibration or shock absorbing means, adapted to be interposed in a suitable manner between two relatively movable bodies, for example the body of a vehicle and its running gear, and the invention is described in reference to such application and more particularly to an automobile, the principal object of the invention being to reduce largely the shock or vibration resulting from high speed of the vehicle, or its travel over obstacles or ruts in the road.

The invention consists in the various novel and peculiar arrangements and combinations of the several different parts of the device, all as hereinafter fully set forth and then pointed out in the claims.

I have illustrated a type of my invention in the accompanying drawings, wherein;

Figures 1 and 2 show, on a somewhat reduced scale, a side and a top view of my improved device as applied to a vehicle. Fig. 3 is a view of a longitudinal section, of the cone and socket bearing, and the stud and bracket on which the same is mounted. Fig. 4 is a side view of the cone of the bearing shown as detached. Fig. 5 is an end view of the base of the cone. Fig. 6 is a cross sectional view of the cone taken on plane indicated by line 6—6, Fig. 4. Fig. 7 is a view in cross section of a modified form of the cone, and Fig. 10 is a side view of the same. Fig. 8 is a view partly in section of the links which connect the pivoted arms, which latter are shown in section. Fig. 9 is a side view partly in section of the attaching bolt or stud of one of the pivoted arms with the latter shown in cross section.

Referring to the drawings in which like numbers of reference designate like parts throughout, 1 is a fixed part of the vehicle body and 2 is the axle of the running gear, and 3 is the ordinary spring interposed between the axle and the body of the vehicle. In this description, the two bodies referred to as relatively movable bodies are constituted by the body of the vehicle on the one hand and the running gear of the vehicle on the other, the relative movement being that of approaching and receding from each other in the usual manner of a spring mounted vehicle while the side sway referred to is a relative lateral movement which one of these bodies has to the other, in taking a curve and particularly under high speed.

To a suitable part of the vehicle body is secured a bracket 4 which is made fast thereto by suitable bolts 5, and this bracket is formed with a stud 6 which is preferably made integral with the bracket. The outer end of the stud 6 is screw-threaded at 7, and a longitudinally extending feather or spline 8 is mounted on the stud, and takes loosely in a groove 9, extending longitudinally along the interior of the bore or perforation 10, which is formed through the cone 11, which by means of the groove and feather is removably mounted upon the stud and has the capacity of endwise adjustment thereon, but cannot move angularly or rotate thereon, the stud and cone being thus fixed in respect to rotation.

The bracket 4 and its stud 6 may be made in a single forging, if desired. The feather 8 on the stud consists in a segmental shaped piece having its curved edge resting in an arc shaped slot $8^a$ formed in the side of the stud, which slot may be readily cut by a wheel or other suitable tool. The cone 11 is of a truncated form and is disposed with its smaller end lying inwardly while its base lies outwardly toward the outer end of the stud 6. At the inner and smaller end of the cone 11, it is formed upon its exterior with a flange 12 while a similar flange 13 extends around the large end of the cone and exteriorly thereof. The periphery of the cone is formed with a series of longitudinal grooves 14 which are arranged at equal distances apart around the periphery of the cone and are slightly under-cut to receive strips of suitable material 15 which may be slid endwise into position on the cone. These grooves 14 extend throughout the length of the cone and through the flanges so that the bearing surface of the cone against the interior of its conical socket 16, is constituted practically by the exterior of the strips 15, which are formed upon their exteriors suitably to fit the conical socket 16, as indicated in the drawings. This arrangement of the end flanges 12 and 13 and the strips 15 on the periphery of the cone provides suitable longitudinally extending cavities 17 for the reception of a lubricant. The strips 15 are made of suitable friction producing material, such for instance, as wood or leather fiber, and are removably mounted upon the cone so that they may be easily replaced when necessary.

The conical socket 16 within which the cone 11 operates, is formed in the casing 18 which is carried by the pivoted arm 19, and this casing is imperforate in its sides to make the bearing both water and dust proof, and it is preferably integral with the pivoted arm 19. The socket 16 tapers inwardly to correspond with the cone 11, and a suitable washer 20 is interposed between the bracket 4 and the end of the casing 18. This washer 20 takes in a countersink 20$^a$ formed in the bracket 4 around the stud 6, and also a countersink 20$^b$ formed in the end of the socket 18, so that this washer affords a very effectual seal against the admission of foreign matter or water and also prevents the escape of the lubricant. A nut 21 is mounted upon the screw-thread 7 of the stud 6, and a washer 22 is interposed between the nut and the base of the cone 11, and when the parts are assembled, the turning down of the nut 21 determines the stress between these parts. A countersink 23 is formed in the outer end of the socket 16, for the washer 22 to enter, in tightening up the nut 21, and the flange 13 on the large end of the cone should be thick enough to seal the countersunk 23 to prevent the lubricant from escaping. The cone 11 is somewhat shorter than its socket 16, the inner end of the cone falling short of the inner end of the socket and providing a space 16$^a$, so as to allow for wear and for adjustment. In assembling these parts, the cone 11 may first be inserted in its socket from the outer and large end, and then the cone with its bearing inserted over the stud, the feather 8 sliding in the groove 9 in the cone. The washer 22, may then be applied, and the nut 21 screwed into place against the washer 22. The extent to which the nut 21 is turned down on the stud so as to act upon the cone determines the stress or tension between the cone and its socket 16, and the cone and socket bearing may be made to tightly or loosely bind or clutch itself to regulate the stiffness or looseness of this joint which is designed to receive and absorb the vibrations and shocks to which the parts are subjected. The space 16$^a$ between the inner and smaller end of the cone 11 and the part lying beyond it permits of the cone being tightly forced into the socket and also allows for the wear of the parts. The imperforate walls of the casing 18, and the washer 20 between such casing and the bracket 4, and the tight fit of the outer end of the cone in the outer end of the socket, prevents the water or dust from finding its way in between the cone and socket and thereby renders it dust and water proof. The cavities 17 between the longitudinal strips 15 when supplied with a lubricant keep the bearing well lubricated and thus saves a great deal of unnecessary wear of the parts, at the same time does not prevent the clutching of the cone with its socket to produce the necessary friction for the purpose of absorbing the shock.

In Fig. 7, I show a modified form of the cone which is made up of two separate parts, an inner conical tubular part 60 having solid or imperforate walls and an outer conical sleeve 61 fitting thereon and provided with elongated perforations 62 for the reception of the lubricant. These two parts being put one within the other, as indicated in Fig. 7, are then mounted on the stud in the manner described in reference to the single conical part 11.

The arm 19 is connected with a pair of links 25 and 26 by means of a pivot bolt 27 one end of which is provided with a nut 28 for tightening or loosening the joint. The stem of the bolt 27 passes through perforations 29, 30 and 31 which are formed in the two links and the arm 19, respectively, and which perforations register with each other, as indicated in Fig. 8. Between each link and the adjacent side of the arm 19 is interposed a washer 32 made of suitable fibrous material for producing friction between the moving parts and these washers are provided with raised centers 33 which take into a countersink 34 in the adjacent side of the arm 19, so that the washers may be retained in operative positions even though they become cracked. The bolt 27 is held from rotating in relation to the link 25 by means of the key 35 projecting from the stem of the bolt 27 into a notch in the edge of the perforation 29 formed in the link 25 and through which the bolt extends, as is indicated in Fig. 8. This key 35 prevents the bolt and its nut from working loose. The other ends of the links 25 and 26 are pivotally attached to a second arm 36, by means of a similar pivotal joint and washers to that just described between the arm 19, and the links 25 and 26, and the parts thus joined are indicated by the same numerals of reference with the addition of the prime mark thereto, the numerals of reference running from 27' to 35'.

The pivoted arm 36 is so constructed that its two ends stand at right angles to each other and in the present case this feature is provided for by making a right hand twist in the forging itself, as indicated at 37 in Fig. 1. This peculiar construction of the pivoted member 36 provides two pivotal joints at right angles to each other and permits said swaying or relative lateral movement of the two bodies between which the device is mounted. The lower end of the twisted member 36 is provided with a perforation 38 through which extends a stud or pin 39, one end of which is screw-threaded and provided with a nut 40. At a suitable point on the pin 39 is a fixed part or disk 41 which may be formed integral with the pin 39 and serves as an abutment against which the pivoted arm 36 and the interposed washers 42 and 43 of fibrous material as well as the metal washer 44 against which the nut bears, may be forced by the action of the nut 40. These fibrous washers 42 and 43 are formed with raised centers which take into countersunk places on the adjacent sides of the arm 36, in the manner previously described in reference to the other joints and for the purpose of retaining such washers in place in case of breakage. The part 41 being made integral with the pin 39 allows for variations in the spring and axle brackets to which the device may be attached. In the present instance, the pin 39 is secured to the upright part 50 of a bracket, the other part 51 of which is secured in horizontal position against the spring 3 by means of U-shaped bolts 52 and nuts 53. The pin 39 is screw-threaded and passes through a perforation in the part 50 of the bracket and is also provided with a key 54 (see Figs. 1 and 9) which takes into a notch in the perforation in the bracket and prevents the pin from turning. The pin is made fast to the bracket by a nut 56 and a washer 55.

While I have shown in the drawings the device attached between the two movable bodies in such a manner that the links 25 and 26 are substantially vertical, I find that it is preferable to have the same inclined somewhat out of the vertical.

It will be understood that the cone-and-socket joint for maintaining the desired friction to absorb the shocks, may be located at any other point in the device than the point of attachment to the body 1 of the vehicle, as shown. For example, it may be at either end of the links 25 and 26 and I propose to thus transpose it, if desired. I might add also that the lubricant which is retained in the cone-and-socket joint by the especially provided cavities therein, cannot easily escape from the joint or be squeezed out so that this important joint is kept constantly well lubricated, thereby preventing squeaking of the parts and preventing one part from biting on the other, as would be the case without the lubricant.

From the foregoing description, it will be readily understood that when the device is mounted for example on an automobile, between the body 1, and the axle, with the cone-and-socket joint tightened up to the desired tension and with the other joints made somewhat tight, any shocks resulting from the jolting of the vehicle over obstacles or ruts, or from high speed, will be largely absorbed by the cone-and-socket joint. In addition to this, the axis of motion of the joint provided between the twisted arm 36 and the axle or other point of attachment, being at right angles to the other joints and extending longitudinally of the vehicle, will permit an extended lateral movement between the vehicle body and its running gear, so that such side movement which occurs to a large extent in taking curves under high speed, is amply provided for.

Having thus described my invention what I claim and desire to secure by Letters Patent is:—

1. A shock absorber provided with a cone-and-socket joint, the said joint comprising a stud fixed relatively to one member, a conical socket fixed relatively to the other member, a cone mounted on said stud so as to slide but not to turn thereon and fitting said socket, and means for adjusting the cone on the stud and holding it in such adjustment to regulate the tension of the joint.

2. A shock absorber provided with a cone-and-socket joint, the said joint comprising a stud fixed relatively to one member, a conical socket fixed relatively to the other member, a cone mounted on said stud so as to slide but not to turn thereon and fitting said socket, a follower on said stud engaging said cone to adjust it in its socket, and means for locking the follower against the cone.

3. A shock absorber provided with a cone-and-socket joint, the said joint comprising a stud fixed relatively to one member, an inwardly converging conical socket fixed relatively to the other member, a cone mounted on said stud so as to slide but not to turn thereon, and means for forcing the cone in the socket and holding it therein to regulate the tension of the joint.

4. A shock absorber provided with a cone-and-socket joint, the said joint comprising a stud fixed relatively to one member, and provided with a screw-thread, a conical socket fixed relatively to the other member, a cone mounted on said stud so as to slide but not to turn thereon and fitting said socket, a plate or follower mounted on said stud and adapted to engage the larger end of the cone, and a nut mounted on the screw-thread of the stud for engaging said follower to force the cone in the socket.

5. A shock absorber comprising pivoted members suitably mounted between two relatively movable bodies and having one of its joints provided with a friction device, the axes of motion of some of the pivotal joints being parallel with each other while the axis of motion of another of the joints is at right angles thereto, one of said pivoted members having its respective ends arranged in planes at right angles to each other and being so arranged as to permit of relative side swaying of said bodies.

6. A shock absorber comprising pivoted arms mounted respectively upon relatively movable bodies and connected to each other by a pivoted link, one of the joints being provided with a friction device, and one of said arms having its respective ends disposed at right angles to each other and being so arranged as to permit of relative side swaying of the said bodies.

7. A shock absorber suitably mounted between relatively movable bodies and provided with a cone-and-socket joint adapted to offer resistance to the relative movement of the bodies and to absorb the shock resulting from such movement, the said cone-and-socket joint being provided with friction blades for increasing the friction of the joint, and lubricant retaining cavities between said blades.

8. A shock absorber adapted to be mounted between relatively movable bodies and having a pivoted arm provided with a cone-and-socket joint, the same comprising an inwardly converging conical socket on said arm, a stud, an abutment fixed relatively to said stud and against which the end of said socket bears, a cone adjustable longitudinally on said stud and adapted to be slid but not rotated thereon and fitting in said conical socket, and means for adjusting and holding in adjustment said cone on said stud to regulate the friction between the cone and socket.

9. A shock absorber comprising a bracket adapted to be secured to one of the two relatively movable bodies and provided with a stud, a cone mounted on said stud and adapted to be moved endwise thereon but not to rotate and having its base lying outwardly, a pivoted arm provided with a socket having an interior conical taper conforming to the cone and fitting over the same the interior of the socket being longer than the cone, means for adjusting the cone and socket longitudinally of each other to tighten or loosen the cone in its socket, and pivoted connections between said arm and the other one of the two said movable bodies.

10. A shock absorber comprising a bracket adapted to be secured to one of the two relatively movable bodies and provided with a stud, a cone mounted on said stud and adapted to be moved endwise thereon but not to rotate and having its base lying outwardly, a pivoted arm provided with a socket having an interior conical taper conforming to the cone and fitting over the same, the interior of the socket being longer than the cone, the small end of which lies within the inner end of said socket so as to permit of adjustment, said stud being threaded on its outer end and provided with a nut working on said thread so as to act against the base of the cone and adapted to regulate the stress between said cone and its bearing, and pivoted connections between said arm and the other one of the movable bodies.

11. A shock absorber comprising a bracket adapted to be secured to one of the two relatively movable bodies and provided with a stud, a cone mounted on said stud and having its base lying outwardly, a pivoted arm provided with a socket having an interior conical taper conforming to the cone and fitting over the same, the interior of the socket being longer than the cone, the small end of which lies within the inner end of said socket so as to permit of adjustment, said cone being adjustable endwise on said stud but held against rotation thereon, said stud being threaded on its outer end and provided with a nut working on said thread so as to act against the base of the cone and adapted to regulate the stress between said cone and its bearing, a washer interposed between said nut and the base of the cone, and pivotal connections between said arm and the other one of the movable bodies.

12. A shock absorber comprising a bracket adapted to be secured to one of two relatively movable bodies and provided with a stud and having its outer end screw-threaded, a cone provided with a central perforation fitting on said stud, a pivoted arm provided with a conical socket conforming to the cone and fitting over the same, a longitudinally arranged feather and groove between said stud and cone, whereby the cone may be adjusted longitudinally on the stud but not rotated thereon, a nut on said stud, so as to act against the base of the cone and adapted to regulate the stress between said cone and its bearing, and pivoted connections between said arm and the other one of said movable bodies.

13. A shock absorber comprising a bracket adapted to be secured to one of two relatively movable bodies and provided with a stud and having its outer end screw-threaded, a feather on said stud, a cone provided with a central perforation fitting on said stud and having a longitudinal groove for said feather on the stud, whereby the cone may be adjusted longitudinally on the stud but not rotated thereon, a pivoted arm provided with a conical socket conforming to the cone and fitting over the same, a nut working on said thread so as to act against the base of the cone and adapted to regulate the stress between said cone and its bearing, a washer interposed between said nut and the base of the cone and adapted to bear upon the base of said cone to maintain it in its adjusted position and pivoted connections between said arm and the other one of the movable bodies.

14. A shock absorber comprising pivoted members suitably mounted between two relatively movable bodies and having one of its joints provided with a friction device, the axes of motion of some of the pivotal joints being parallel with each other while the axis of motion of another of the joints is at right angles thereto, one of said pivoted members being twisted on itself so that its respective ends are disposed in planes substantially at right angles to each other and being so arranged as to permit of relative side swaying of said bodies.

15. A shock absorber suitably mounted between relatively movable bodies and provided with a cone-and-socket joint adapted to offer resistance to the relative movement of the bodies and to absorb the shock resulting from such movement, the said cone being provided at its respective ends with a flange and having its periphery provided with longitudinally arranged strips of suitable material constituting the bearing surface of the said cone in its socket.

16. A shock absorber suitably mounted between relatively movable bodies and provided with a cone-and-socket joint adapted to offer resistance to the relative movement of the bodies and to absorb the shock resulting from such movement, the said cone being provided at its respective ends with a flange and having its periphery provided with longitudinally arranged strips of suitable material constituting the bearing surface of the said cone in its socket, the said strips of material being removable for replacement.

17. A shock absorber suitably mounted between relatively movable bodies and provided with a cone-and-socket joint adapted to offer resistance to the relative movement of the bodies and to absorb the shock resulting from such movement, the said cone being provided at its respective ends with a flange, a series of longitudinally extending grooves formed in the periphery of said cone and extending through said flanges, and strips of suitable material inserted in said grooves to constitute the bearing surface of said cone in its socket.

18. A shock absorber suitably mounted between relatively movable bodies and provided with a cone-and-socket joint adapted to offer resistance to the relative movement of the bodies and to absorb the shock resulting from such movement, the said cone being provided at its respective ends with a flange, a series of longitudinally extending under-cut grooves formed in the periphery of said cone and extending through said flanges, and strips of suitable material conforming substantially to said under-cut grooves and inserted therein to constitute the bearing of said cone in its socket.

19. A shock absorber adapted to be mounted between relatively movable bodies and having a pivoted arm provided with a conical socket, a stud secured to one of said bodies, an abutment against which the inner end of said socket bears and said abutment being fixed relatively to the said stud, a cone fitting within said socket and longitudinally adjustable on said stud but held against rotation thereon, and means mounted on said stud for adjusting said cone and holding it in its adjustment, a washer interposed between said abutment and the adjacent end of said socket, and a second washer interposed between the other end of said socket and said means on the stud whereby the cone-and-socket joint is rendered dust and water proof.

In testimony whereof, I have hereunto set my hand in the presence of the two subscribing witnesses.

EDWARD HELMUS.

Witnesses:
A. M. HAYES,
WILLIS FOWLER.